United States Patent
Vajapeyam et al.

(10) Patent No.: US 9,642,157 B2
(45) Date of Patent: May 2, 2017

(54) METHODS AND APPARATUS FOR EFFICIENT SUPPORT OF VARIABLE BIT RATE VOICE TRAFFIC ON LONG TERM EVOLUTION UPLINK

(71) Applicant: QUALCOMM Incorporated, San Diego, CA (US)

(72) Inventors: Madhavan Srinivasan Vajapeyam, San Diego, CA (US); Min Wang, San Diego, CA (US); Sai Yiu Duncan Ho, San Diego, CA (US); Aleksandar Damnjanovic, Del Mar, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 48 days.

(21) Appl. No.: 14/750,672

(22) Filed: Jun. 25, 2015

(65) Prior Publication Data
US 2015/0382372 A1   Dec. 31, 2015

Related U.S. Application Data

(60) Provisional application No. 62/018,218, filed on Jun. 27, 2014.

(51) Int. Cl.
*H04W 72/12* (2009.01)
*H04W 24/10* (2009.01)
(Continued)

(52) U.S. Cl.
CPC ....... *H04W 72/1263* (2013.01); *H04W 24/10* (2013.01); *H04W 72/04* (2013.01); *H04W 72/0413* (2013.01); *H04W 76/048* (2013.01)

(58) Field of Classification Search
CPC . H04W 72/1263; H04W 24/10; H04W 72/04; H04W 72/0413; H04W 76/048
(Continued)

(56) References Cited

U.S. PATENT DOCUMENTS

2012/0155416 A1   6/2012   Zhang et al.
2013/0100936 A1   4/2013   Pettersson
(Continued)

FOREIGN PATENT DOCUMENTS

EP            2237633 A1     10/2010
WO      WO-2013127634 A1     9/2013

OTHER PUBLICATIONS

International Search Report and Written Opinion—PCT/US2015/037986—ISA/EPO—Oct. 27, 2015.

*Primary Examiner* — Ronald B Abelson
(74) *Attorney, Agent, or Firm* — Patterson & Sheridan, L.L.P.

(57) ABSTRACT

Certain aspects of the present disclosure relate to techniques and apparatus for efficient support of variable bit rate (VBR) voice traffic on LTE uplink. In an aspect, a base station may periodically schedule transmission resources for use by a user equipment (UE) for transmitting data on a logical channel, wherein the periodically scheduling grants the UE a fixed first transport block (TB) size of transmission resources at regular intervals, receive an indication from the UE of an amount of data for transmission on the logical channel, and adjust the fixed first TB size of the periodically scheduled transmission resources to a fixed second TB size based on the indicated amount of data. In another aspect, a base station may configure a UE to enable scheduling request masking (SR-masking) on a logical channel, and configure the UE with a threshold amount of data for the logical channel to dynamically disable SR-masking on the logical channel. In another aspect, a UE may receive a configuration to enable scheduling request (SR) masking (SR-masking) on a logical channel, receive a configuration of a threshold amount of data for the logical channel to dynamically disable SR-masking on the logical channel, and
(Continued)

decide whether to transmit an SR based on the amount of data to transmit and the threshold amount.

22 Claims, 11 Drawing Sheets

(51) Int. Cl.
*H04W 72/04* (2009.01)
*H04W 76/04* (2009.01)

(58) Field of Classification Search
USPC .......................................................... 370/329
See application file for complete search history.

(56) References Cited

U.S. PATENT DOCUMENTS

| | | |
|---|---|---|
| 2014/0023010 A1 | 1/2014 | Loehr et al. |
| 2014/0135027 A1 | 5/2014 | Kodali et al. |
| 2014/0269475 A1 | 9/2014 | Ehsan et al. |
| 2015/0009874 A1 | 1/2015 | Edara et al. |

METHODS AND APPARATUS FOR EFFICIENT SUPPORT OF VARIABLE BIT RATE VOICE TRAFFIC ON LONG TERM EVOLUTION UPLINK

CROSS-REFERENCE TO RELATED APPLICATIONS

The present application for patent claims priority to U.S. Provisional Application No. 62/018,218, filed Jun. 27, 2014, which is assigned to the assignee of the present application and hereby expressly incorporated by reference herein in its entirety.

BACKGROUND

Field of the Disclosure

The present disclosure relates generally to wireless communication, and more particularly, to methods and apparatus for efficient support of variable bit rate (VBR) voice traffic on long term evolution (LTE) uplink.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. "LTE" refers generally to LTE and LTE-Advanced (LTE-A). Preferably, these improvements should be applicable to other multi-access technologies and the telecommunication standards that employ these technologies.

SUMMARY

Certain aspects of the present disclosure provide a method for wireless communications by a base station (BS). The method generally includes periodically scheduling transmission resources for use by a user equipment (UE) for transmitting data on a logical channel, wherein the periodically scheduling grants the UE a fixed first transport block (TB) size of transmission resources at regular intervals, receiving an indication from the UE of an amount of data for transmission on the logical channel, and adjusting the fixed first TB size of the periodically scheduled transmission resources to a fixed second TB size based on the indicated amount of data.

Certain aspects of the present disclosure provide an apparatus for wireless communications by a base station (BS). The apparatus generally includes at least one processor configured to periodically schedule transmission resources for use by a user equipment (UE) for transmitting data on a logical channel, wherein the periodically scheduling grants the UE a fixed first transport block (TB) size of transmission resources at regular intervals, receive an indication from the UE of an amount of data for transmission on the logical channel, and adjust the fixed first TB size of the periodically scheduled transmission resources to a fixed second TB size based on the indicated amount of data, and a memory coupled with the at least one processor.

Certain aspects of the present disclosure provide an apparatus for wireless communications by a base station (BS). The apparatus generally includes means for periodically scheduling transmission resources for use by a user equipment (UE) for transmitting data on a logical channel, wherein the periodically scheduling grants the UE a fixed first transport block (TB) size of transmission resources at regular intervals, means for receiving an indication from the UE of an amount of data for transmission on the logical channel, and means for adjusting the fixed first TB size of the periodically scheduled transmission resources to a fixed second TB size based on the indicated amount of data.

Certain aspects of the present disclosure provide computer-readable medium storing computer executable code. The code generally includes instructions for periodically scheduling transmission resources for use by a user equipment (UE) for transmitting data on a logical channel, wherein the periodically scheduling grants the UE a fixed first transport block (TB) size of transmission resources at regular intervals, instructions for receiving an indication from the UE of an amount of data for transmission on the logical channel, and instructions for adjusting the fixed first TB size of the periodically scheduled transmission resources to a fixed second TB size based on the indicated amount of data.

Aspects generally include methods, apparatus, systems, computer program products, and processing systems, as substantially described herein with reference to and as illustrated by the accompanying drawings.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
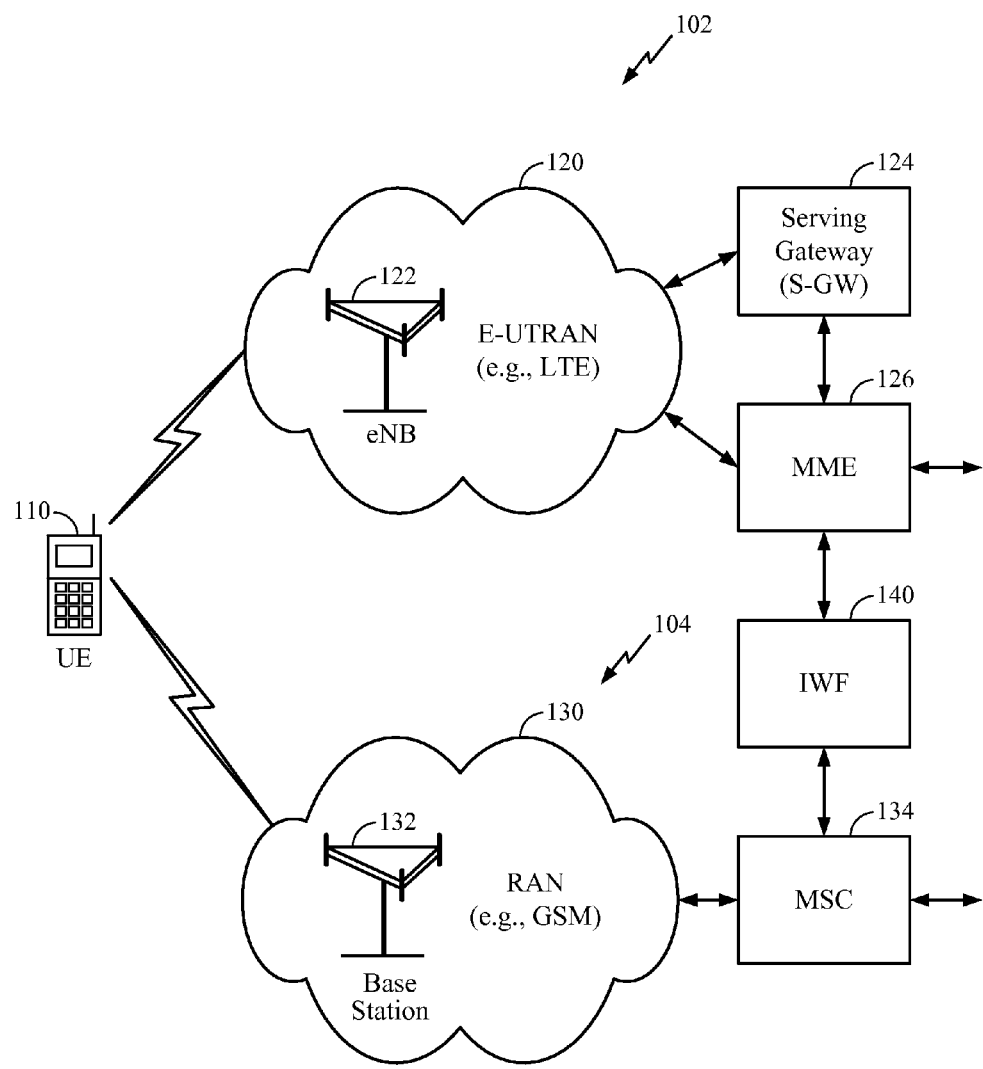
FIG. 1 illustrates an exemplary deployment in which multiple wireless networks have overlapping coverage, in accordance with certain aspects of the present disclosure.

Wireless communications systems operating according to LTE standards typically control access to the radio frequency spectrum via assignments made by base stations (e.g., eNodeBs). That is, a user equipment (UE) that has data to transmit must receive an allocation of transmission resources from a base station before transmitting the data on the allocated transmission resources. When a UE is being used for a voice call, the UE converts the sounds of the words spoken by the user into a data stream that the UE transmits to the UE's serving base station. In order to cause the voice call to appear (to the persons participating in the call) to be a continuous connection with no gaps, the UE transmits data packets at frequent (e.g., 20 ms) intervals. When a person is speaking, there are gaps (e.g., between words) in which the person makes no sound. For this and other reasons, the data packets of a voice call vary significantly in size. Traffic transmitted at regular intervals in packets of varying size may be referred to as variable bit rate (VBR) traffic, because the number of bits transmitted in each interval varies. Thus, a serving BS should allocate transmission resources for the UE to transmit data packets of the call at frequent intervals, but the BS does not have information regarding the size of each data packet. If the UE informs the BS of the size of a data packet and then waits for the BS to allocate transmission resources for the packet, then latency of the call increases and a large amount of transmission resources are consumed by the UE sending the data packet size to the BS.

According to aspects of the present disclosure, techniques are provided for a BS to use information from buffer status reports (BSR) and traffic sizes while performing efficient scheduling of VBR voice traffic.

Certain aspects of the present disclosure provide for a scheduling request (SR) masking (SR-masking) procedure to be used by a UE for efficient operation while using connected discontinuous reception (C-DRX) techniques. The SR-masking procedure described herein may be applicable to both semi-persistent scheduling (SPS) and dynamic scheduling.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 shows an exemplary deployment in which multiple wireless networks have overlapping coverage. An evolved universal terrestrial radio access network (E-UTRAN) 120 may support LTE and may include a number of evolved Node Bs (eNBs) 122 and other network entities that can support wireless communication for user equipments (UEs).

Each eNB may provide communication coverage for a particular geographic area. The term "cell" can refer to a coverage area of an eNB and/or an eNB subsystem serving this coverage area. A serving gateway (S-GW) 124 may communicate with E-UTRAN 120 and may perform various functions such as packet routing and forwarding, mobility anchoring, packet buffering, initiation of network-triggered services, etc. A mobility management entity (MME) 126 may communicate with E-UTRAN 120 and serving gateway 124 and may perform various functions such as mobility management, bearer management, distribution of paging messages, security control, authentication, gateway selection, etc. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

A radio access network (RAN) 130 may support GSM and may include a number of base stations 132 and other network entities that can support wireless communication for UEs. A mobile switching center (MSC) 134 may communicate with the RAN 130 and may support voice services, provide routing for circuit-switched calls, and perform mobility management for UEs located within the area served by MSC 134. Optionally, an inter-working function (IWF) 140 may facilitate communication between MME 126 and MSC 134 (e.g., for 1xCSFB).

E-UTRAN 120, serving gateway 124, and MME 126 may be part of an LTE network 102. RAN 130 and MSC 134 may be part of a GSM network 104. For simplicity, FIG. 1 shows only some network entities in the LTE network 102 and the GSM network 104. The LTE and GSM networks may also include other network entities that may support various functions and services.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs.

A UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, etc.

Upon power up, UE 110 may search for wireless networks from which it can receive communication services. If more than one wireless network is detected, then a wireless network with the highest priority may be selected to serve UE 110 and may be referred to as the serving network. UE 110 may perform registration with the serving network, if necessary. UE 110 may then operate in a connected mode to actively communicate with the serving network. Alternatively, UE 110 may operate in an idle mode and camp on the serving network if active communication is not required by UE 110.

UE 110 may be located within the coverage of cells of multiple frequencies and/or multiple RATs while in the idle mode. For LTE, UE 110 may select a frequency and a RAT to camp on based on a priority list. This priority list may include a set of frequencies, a RAT associated with each frequency, and a priority of each frequency. For example, the priority list may include three frequencies X, Y and Z. Frequency X may be used for LTE and may have the highest priority, frequency Y may be used for GSM and may have the lowest priority, and frequency Z may also be used for GSM and may have medium priority. In general, the priority list may include any number of frequencies for any set of RATs and may be specific for the UE location. UE 110 may be configured to prefer LTE, when available, by defining the priority list with LTE frequencies at the highest priority and with frequencies for other RATs at lower priorities, e.g., as given by the example above.

UE 110 may operate in the idle mode as follows. UE 110 may identify all frequencies/RATs on which it is able to find a "suitable" cell in a normal scenario or an "acceptable" cell in an emergency scenario, where "suitable" and "acceptable" are specified in the LTE standards. UE 110 may then camp on the frequency/RAT with the highest priority among all identified frequencies/RATs. UE 110 may remain camped on this frequency/RAT until either (i) the frequency/RAT is no longer available at a predetermined threshold or (ii) another frequency/RAT with a higher priority reaches this threshold. This operating behavior for UE 110 in the idle mode is described in 3GPP TS 36.304, entitled "Evolved Universal Terrestrial Radio Access (E-UTRA); User Equipment (UE) procedures in idle mode," which is publicly available.

UE 110 may be able to receive packet-switched (PS) data services from LTE network 102 and may camp on the LTE network while in the idle mode. LTE network 102 may have limited or no support for voice-over-Internet protocol (VoIP), which may often be the case for early deployments of LTE networks. Due to the limited VoIP support, UE 110 may be transferred to another wireless network of another RAT for voice calls. This transfer may be referred to as circuit-switched (CS) fallback. UE 110 may be transferred to a RAT that can support voice service such as 1xRTT, WCDMA, GSM, etc. For call origination with CS fallback, UE 110 may initially become connected to a wireless network of a source RAT (e.g., LTE) that may not support voice service. The UE may originate a voice call with this wireless network and may be transferred through higher-layer signaling to another wireless network of a target RAT that can support the voice call. The higher-layer signaling to transfer the UE to the target RAT may be for various procedures, e.g., connection release with redirection, PS handover, etc.

Figure 2:
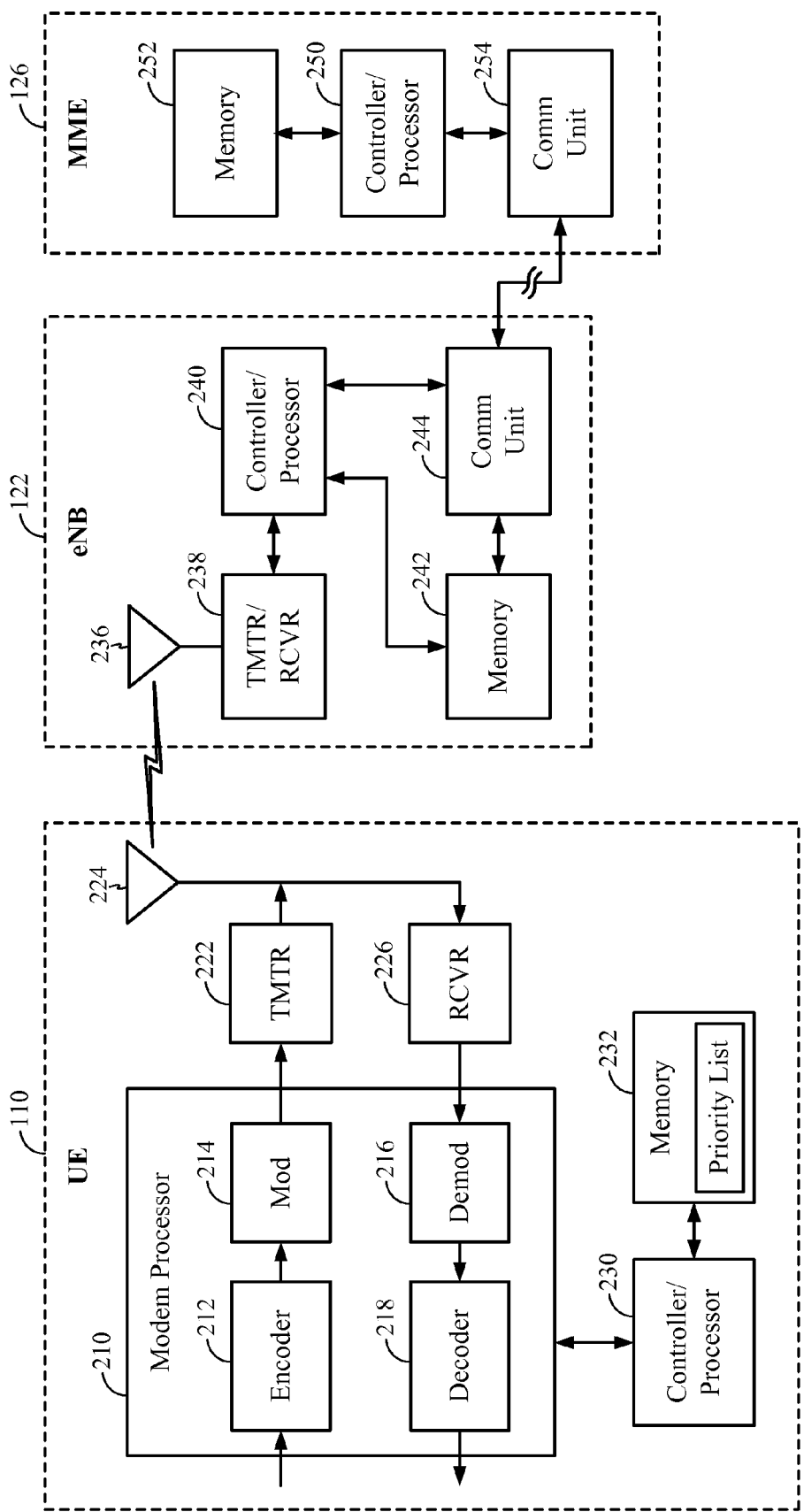
FIG. 2 illustrates a block diagram of a user equipment (UE) and other network entities, in accordance with certain aspects of the present disclosure.

FIG. 2 shows a block diagram of a design of UE 110, eNB 122, and MME 126 in FIG. 1. At UE 110, an encoder 212 may receive traffic data and signaling messages to be sent on the uplink. Encoder 212 may process (e.g., format, encode, and interleave) the traffic data and signaling messages. A modulator (Mod) 214 may further process (e.g., symbol map and modulate) the encoded traffic data and signaling messages and provide output samples. A transmitter (TMTR) 222 may condition (e.g., convert to analog, filter, amplify, and frequency upconvert) the output samples and generate an uplink signal, which may be transmitted via an antenna 224 to eNB 122.

On the downlink, antenna 224 may receive downlink signals transmitted by eNB 122 and/or other eNBs/base stations. A receiver (RCVR) 226 may condition (e.g., filter, amplify, frequency downconvert, and digitize) the received signal from antenna 224 and provide input samples. A demodulator (Demod) 216 may process (e.g., demodulate) the input samples and provide symbol estimates. A decoder 218 may process (e.g., deinterleave and decode) the symbol estimates and provide decoded data and signaling messages sent to UE 110. Encoder 212, modulator 214, demodulator 216, and decoder 218 may be implemented by a modem processor 210. These units may perform processing in accordance with the RAT (e.g., LTE, 1×RTT, etc.) used by the wireless network with which UE 110 is in communication.

A controller/processor 230 may direct the operation at UE 110. Controller/processor 230 may also perform or direct other processes for the techniques described herein. Controller/processor 230 may also perform or direct the processing by UE 110 in FIG. 8. Memory 232 may store program codes and data for UE 110. Memory 232 may also store a priority list and configuration information.

At eNB 122, a transmitter/receiver 238 may support radio communication with UE 110 and other UEs. A controller/processor 240 may perform various functions for communication with the UEs. On the uplink, the uplink signal from UE 110 may be received via an antenna 236, conditioned by receiver 238, and further processed by controller/processor 240 to recover the traffic data and signaling messages sent by UE 110. On the downlink, traffic data and signaling messages may be processed by controller/processor 240 and conditioned by transmitter 238 to generate a downlink signal, which may be transmitted via antenna 236 to UE 110 and other UEs. Controller/processor 240 may also perform or direct other processes for the techniques described herein. Controller/processor 240 may also perform or direct the processing by eNB 122. Memory 242 may store program codes and data for the base station. A communication (Comm) unit 244 may support communication with MME 126 and/or other network entities.

At MME 126, a controller/processor 250 may perform various functions to support communication services for UEs. Controller/processor 250 may also perform or direct the processing by MME 126. Memory 252 may store program codes and data for MME 126. A communication unit 254 may support communication with other network entities.

According to aspects, as will be described in more details herein, the UE 110 may support communications with multiple RATs (e.g., concurrent RATs) (CRAT). The CRAT UE may share uplink transmissions between two RATs, for example, in terms of TDM. The CRAT UE may support dual receiving of downlink transmissions. According to aspects, as will be described in more details herein, the UE 110 may be a single radio device. Such UE may support communications with multiple RATs.

FIG. 2 shows simplified designs of UE 110, eNB 122, and MME 126. In general, each entity may include any number of transmitters, receivers, processors, controllers, memories, communication units, etc. Other network entities may also be implemented in similar manner.

For example, UE 110 of FIG. 2 comprises a single TMTR 222 and a single RCVR 226. According to aspects, UE 110 may comprise a single TMTR and a dual RCVR, and therefore may support CRAT. For example, UE 110 may share uplink transmissions between two RATs and may support dual downlink receiving. According to aspects, the UE may support CRAT with LTE and GMS or CDMA2000 1×RTT.

One challenge with utilizing a single transmitter for multiple RAT communications is that, at times, there may be conflicts between scheduled uplink transmissions in both RATs. While the conflict may occur with an uplink transmission, the uplink transmission itself may result from a scheduled downlink transmission. For example, for scheduled LTE downlink transmissions, a UE may need to transmit an ACK in uplink to confirm it received the data. In other words, it is possible that a UE may be scheduled for uplink transmission in both RATs during given a transmission period.

In some cases, Rx with multiple RATs (e.g., concurrent Rx) may also be achieved. For example, two Rx (e.g., two separate receive chains with two separate antennas) may be shared by GSM or CDMA2000 1×RTT, and LTE in a manner similar to Simultaneous Hybrid Dual Receivers (SHDR). When GSM or CDMA2000 1×RTT receiving is not needed, LTE may use two receive chains for multiple input multiple output (MIMO) and diversity. When GSM or CDMA2000 1×RTT receiving is needed, one Rx may be tuned to GSM or CDMA2000 1×RTT, and the remaining Rx may be used for LTE receiving. In some embodiments, since only one receive chain is being used for LTE, the UE may report a fake channel quality indicator (CQI) to avoid eNB scheduling for dual layer transmission.

Similarly, a challenge that exists with utilizing a single receiver for communications with multiple RATs is that, at times, there may be conflicts between scheduled downlink transmissions in both RATs. UE 110 shown in FIG. 2 comprises a single TMTR 222 and single RCVR 226, and therefore may only communicate with a single RAT at any given time, for example, LTE network 102 or GSM network 104 shown in FIG. 1.

In a single-radio device capable of communicating over multiple RATs (e.g., 1×RTT, GSM, and LTE), such as the UE 110, the device occasionally tunes its radio to each supported RAT and listens for communications (e.g., pages) from a BS of that RAT. In order to detect and receive a page or other communication, the device may tune its radio to a RAT for a period of time (e.g., 80 ms). The device may tune its radio to a particular RAT periodically, with the period (e.g., 1.28 sec, 2.56 sec, etc.) configurable by the network via RRC signaling, for example.

Figure 3:
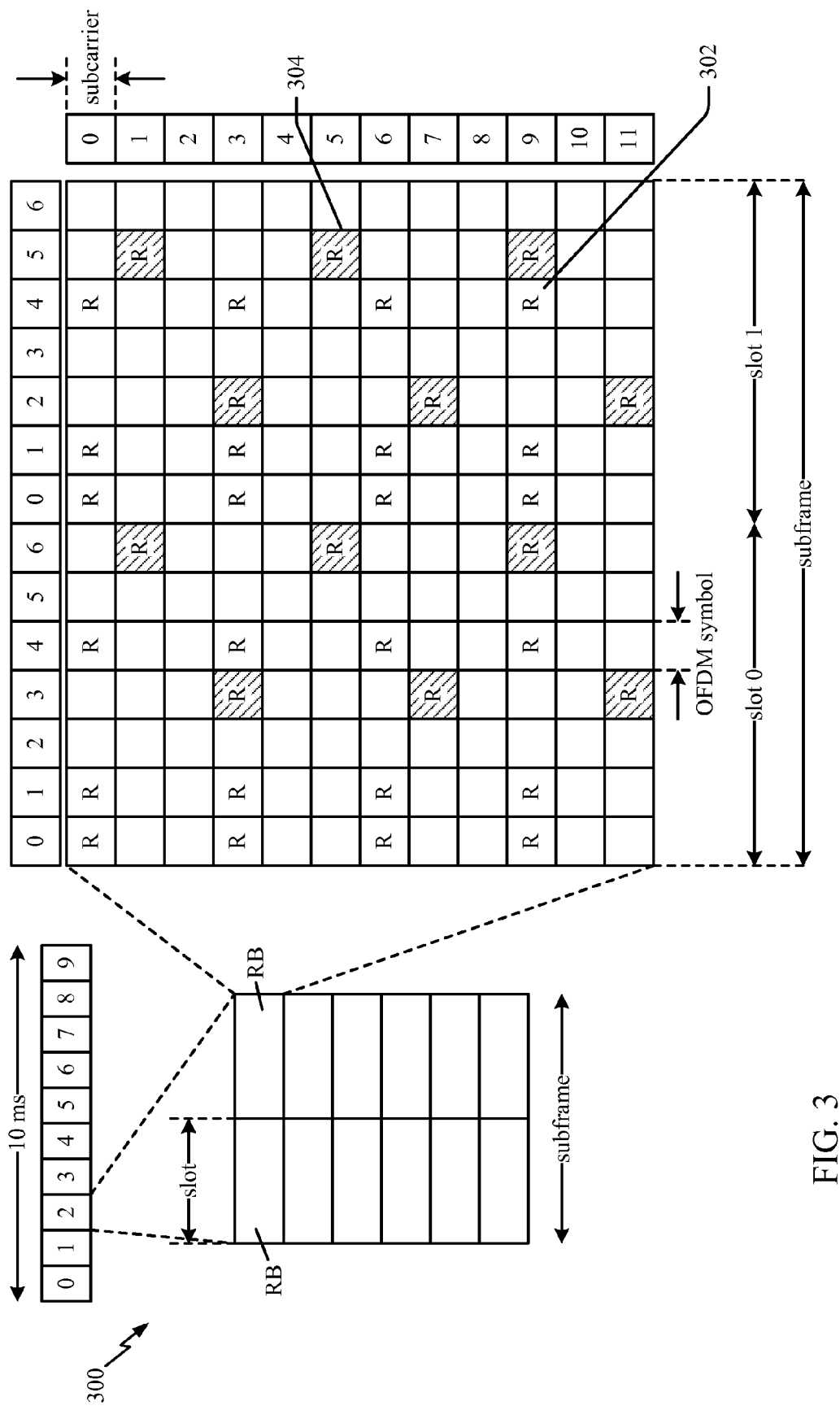
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
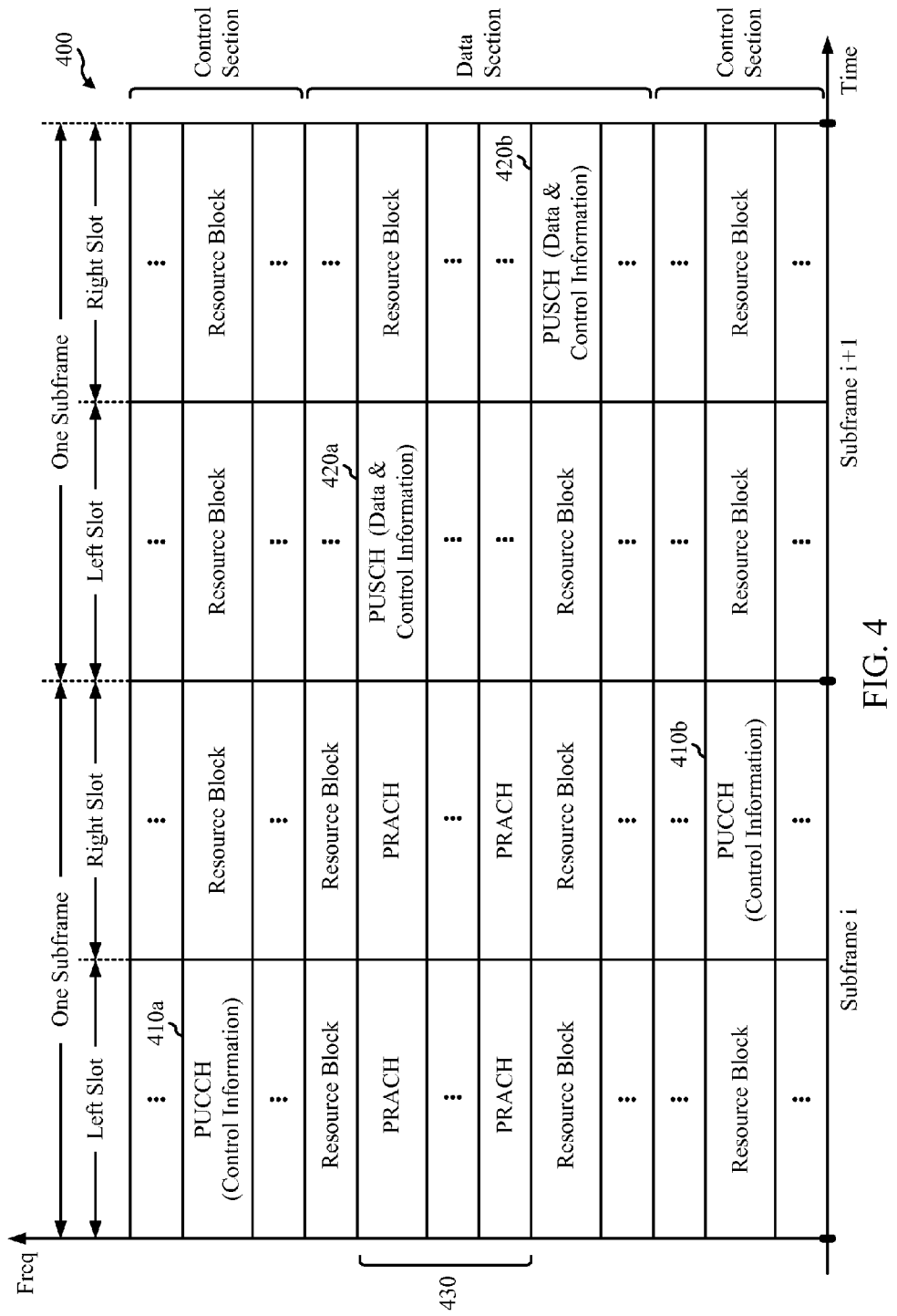
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
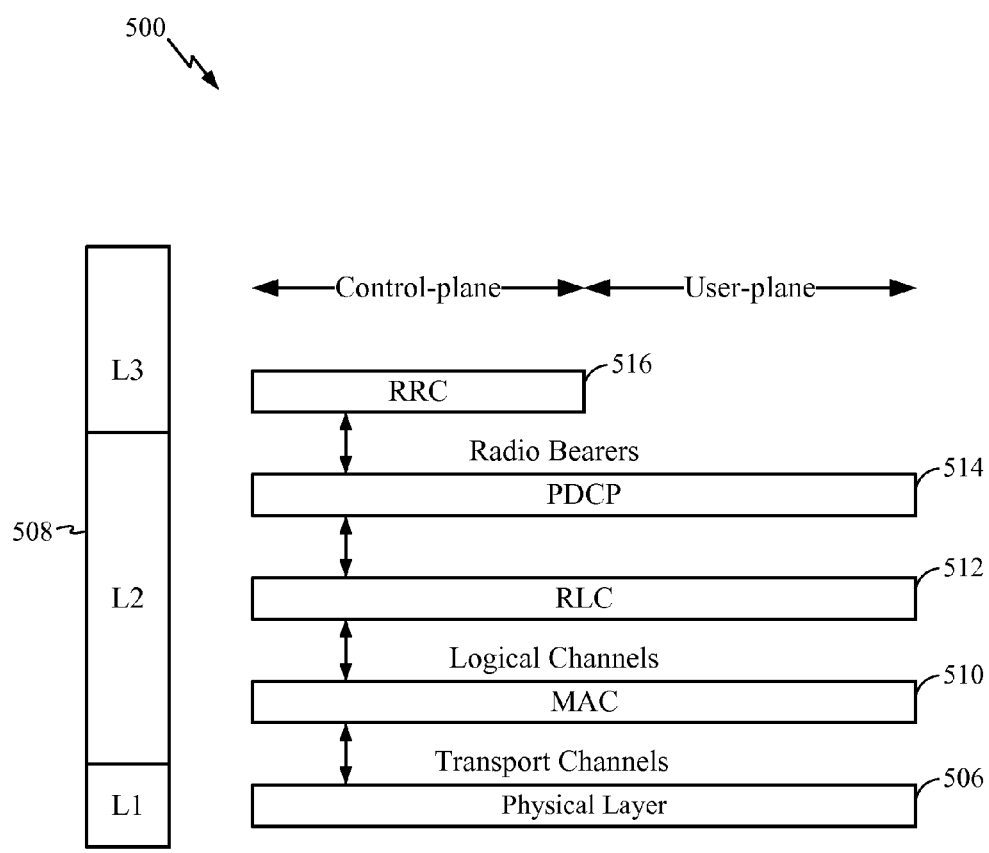
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC)

sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
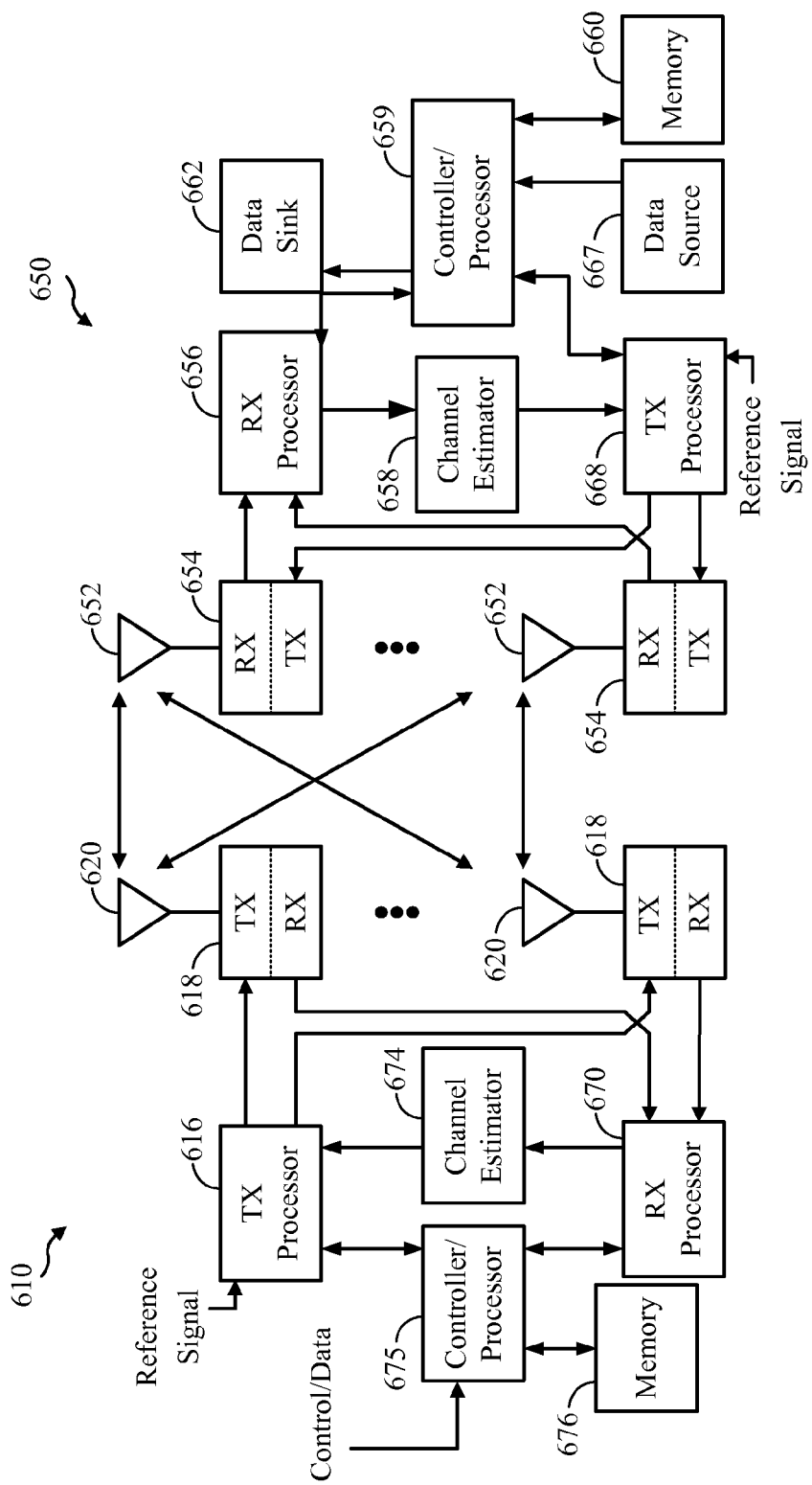
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operation at the eNB 610 and the UE 650, respectively. The controller/processor 659 and/or other processors and modules at the UE 650 may perform or direct the UE in performing operations, for example operations 1000, shown in FIG. 10, and/or other processes for the techniques described herein. The controller/processor 675 and/or other processors and modules at the eNB 610 may perform or direct the eNB in performing operations, for example operations 800 and 900, shown in FIGS. 8 and 9, and/or other processes for the techniques described herein. In aspects, one or more of any of the components shown in FIG. 6 may be employed to perform example operations 800, 900, and 1000 and/or other processes for the techniques described herein.

Example C-DRX Mode Operations

With the ever-increasing popularity of smart phones, there are many new challenges for the design of wireless systems, including power consumption and signaling demands. For example, instead of being awake only for the typically small percentage of talk time, smart phones are awake much more often. Applications, such as e-mail or social networking, may send "keep-alive" message every 20 to 30 minutes, for example. Such applications often use many small and bursty data transmissions that may entail a significantly larger amount of control signaling. Some system level evaluations have identified control channel limitations in addition to traffic channel limitations.

Connected Discontinuous Reception (C-DRX) generally refers to a technique used in wireless communication to reduce power consumption, thereby conserving the battery of the mobile device. The mobile device and the network negotiate phases in which data transfer occurs, where the mobile device's receiver is turned on (e.g., in a connected state), referred to as an on duration of the C-DRX cycle. During other times, referred to as off durations, the mobile device turns its receiver off and enters a low power state. There is usually a function designed into the protocol for this purpose. For example, the transmission may be structured in slots with headers containing address details so that devices may listen to these headers in each slot to decide whether the transmission is relevant to the devices or not. In this case, the receiver may only be active at the beginning of each slot to receive the header, conserving battery life. Other DRX techniques include polling, whereby the device is placed into standby for a given amount of time and then a beacon is sent by the base station periodically to indicate if there is any data waiting for it.

In LTE, C-DRX is typically controlled (configured) via radio resource control (RRC) signaling. For example, RRC signaling may set a cycle where the UE's receiver is operational for a certain period, typically when all the scheduling and paging information is transmitted. The serving evolved Node B (eNB) may know that the UE's receiver is completely turned off and is not able to receive anything. Except when in C-DRX, the UE's receiver may most likely be active to monitor a Physical Downlink Control CHannel (PDCCH) to identify downlink data. During C-DRX, the UE's receiver may be turned off. In LTE, C-DRX may also apply to the RRC_Idle state with a longer cycle time than active mode.

There are generally two RRC states for a UE: (1) RRC_Idle where the radio is not active, but an identifier (ID) is assigned to the UE and tracked by the network; and (2) RRC_Connected with active radio operation having context in the eNB.

Example Methods and Apparatus for Efficient Support of Variable Bit Rate Voice Traffic on LTE Uplink In LTE, the resources for UE (uplink) transmission are typically entirely controlled by the network (e.g., by scheduling performed by an eNB). Therefore, efficiently supporting variable bit rate (VBR) voice traffic on LTE, that is, obtaining the capacity gain of VBR voice traffic with minimal impact to user experience in terms of end-to-end delay and talk time, while working with existing scheduling mechanisms, is challenging since the size of each future coded speech packet is unpredictable, as the size of each packet depends on the speech content of that packet.

An example of the challenges of efficiently supporting VBR voice traffic may be shown by considering the interaction of VBR voice traffic and semi-persistent scheduling (SPS). SPS is a technique of scheduling a UE to transmit a fixed quantity of data at fixed intervals for either a number of transmissions or a period of time. SPS was designed to serve fixed data rate traffic patterns efficiently. However, SPS is typically sub-optimal in terms of network capacity when used to serve VBR traffic. For example, if the SPS grant size (i.e., the quantity of data to be transmitted in each interval) always matches the maximum packet size of the VBR traffic, resources are wasted, because some of the VBR packets are smaller than the maximum packet size. If the SPS grant size is set so that the transmission rate of the SPS operations matches the average rate of VBR traffic, then excessive delay may be introduced when the instantaneous rate of the VBR traffic is above the average rate, as additional resources may need to be requested for the UE to transmit the VBR traffic at the higher instantaneous rate—thus eliminating one of the major advantages of SPS (the extra efficiency caused by the UE not requesting resources every time the UE has data to transmit). In order to take maximum advantage of the capacity of VBR, an eNB needs to send dynamic grants to serve backlogged data in the UE from time to time, depending on how quickly the backlog accumulates at the UE. Performing UE scheduling using dynamic grants creates extra control channel overhead compared to SPS alone.

Another example of the challenges of efficiently supporting VBR voice traffic is the interaction between the VBR voice traffic and the mechanism of C-DRX. C-DRX is designed to enable power efficient support of voice by configuring certain periods of "ON Duration" during a configured DRX cycle, when the UE may receive grant allocations from the network. A typical configuration for a C-DRX cycle is 40 ms, which, if used to support a VBR voice call, implies bundling two 20 ms voice packets in each transmission during a talkspurt. Similar to the interaction of VBR voice traffic with SPS, the UE is regularly scheduled to transmit data, but the packets of data vary in size. Because of the time constraints (e.g., maximum transmission delay) on the VBR voice traffic, the UE may wake up between C-DRX "ON Durations" in order to transmit a scheduling request (SR) to the UE's serving BS when the UE has accumulated VBR voice traffic packets for transmission.

In order to work more efficiently, C-DRX may be further configured with SR-masking. SR-masking involves configuring a logical channel on a UE to not trigger an SR even when there is data on the logical channel for transmission. For example, a voice-call logical channel may be configured with SR-masking and be prevented from triggering an SR upon generation of a first packet. Instead, the UE may wait for a C-DRX ON duration period to transmit the data. SR-masking is designed to cause a UE to avoid triggering a Scheduling Request (SR) when data arrives for the voice logical channel, thus ensuring the UE does not return to C-DRX active state in the middle (i.e., the "OFF" Duration) of the C-DRX cycle.

According to aspects of the present disclosure, techniques are provided for an eNB to use the information of buffer status reports (BSR) and traffic sizes while performing efficient scheduling of VBR voice traffic. For example, an eNB may semi-persistently schedule a UE to regularly transmit VBR voice traffic packets of an average size, and the eNB may increase the size of the of the grant in response to a BSR from the UE showing the UE has more data for transmission than the average size of a VBR voice traffic packet.

Certain aspects of the present disclosure provide techniques for using an SR-masking procedure for efficient operation in C-DRX. The SR-masking procedure described herein may be applicable to both SPS and dynamic scheduling.

According to aspects of the present disclosure, VBR traffic can be grouped by size of the packets involved. A first group may be transmitted in packets of size x, and a second group may be transmitted in packets of size y, where x is less than y. For example, x may be 46 bytes and y may be 76 bytes. In aspects of the present disclosure, an eNB (e.g., a base station) may configure a UE to transmit data using transport blocks (TB) of size x1, which can carry one packet of size x, and/or TBs of size y1, which can carry one packet of size y (where x1 is less than y1).

According to aspects of the present disclosure, an eNB may configure a UE using SPS with period P. P can be 20 ms, for example. The eNB may configure the UE using SPS with a fixed (i.e., fixed until the UE is reconfigured) TB size of x1 (configuring an SPS grant to include one resource block, for example). According to these aspects, while the UE is configured using SPS with a TB size of x1, if the eNB receives a BSR that indicates data is present in the UE buffer, the eNB activates (i.e., reconfigures the UE) SPS with fixed TB size of y1 (configuring the SPS grant to include two resource blocks, for example). While the UE is configured using SPS with a TB size of y1, if the eNB does not receive a BSR, receives a BSR indicating there is no data present in the UE buffer, or receives padding in an uplink transmission from the UE, the eNB activates (i.e., reconfigures the UE) SPS with TB size x1 (configuring the SPS grant to include one resource block, for example).

In other words, the eNB switches the configuration of SPS for the logical channel for the UE between TB sizes of x1 and y1, depending on the value of the received BSR or another indication of the amount of data the UE has for transmission on the logical channel. Other examples of indications of the amount of data the UE has for transmission may be absence of a BSR from the UE (i.e., the UE transmits data but does not transmit a BSR) or padding received in an uplink transmission.

The technique described above may reduce control channel overhead considerably, as compared to fixed SPS or fully dynamic grant cases, if the traffic pattern has runs of packets of a fixed size, which is true in the case of a UE using a VBR type codec such as an enhanced variable rate codec-wideband (EVRC-WB), for example. That is, a UE performing a voice call using an EVRC-WB codec to encode the speech may generate traffic in runs of packets of a fixed size.

The rationale behind the technique described above is if the eNB does not receive an indication that a UE has additional data to transmit (e.g., does not receive a BSR), the eNB should switch (i.e., reconfigure the UE) to SPS with a lower TB size (i.e., x1). On the contrary, if the eNB does receive an indication that a UE has additional data to transmit (e.g., the eNB receives a BSR indicating a large quantity of data for transmission), it means the data of the logical channel is more likely to have runs of packets of size y, so the eNB should switch (i.e., reconfigure the UE) to SPS with a larger TB size (i.e., y1).

According to aspects of the present disclosure, the basic technique described above for single packet scheduling may be generalized to packet bundling of N packets. For example, if N=2 packets are to be bundled per transmission, TB size x1 is chosen so a TB of size x1 can carry at least two packets of size x, and TB size y1 is chosen so a TB of size y1 can carry at least two packets of size y. Additionally, intermediate TB size z1 (where x1<z1<y1) may also be chosen to carry, for example, at least one packet of size x and one packet of size y. Determination of x1, z1, and y1 may be performed independently by each eNB in a network.

The technique is then, assuming N=2 as in the previous paragraph, the eNB configures a UE with SPS with period 2*P. The eNB may configure the UE using SPS with a fixed (i.e., fixed until the UE is reconfigured) TB size of x1 (equal to the quantity of data conveyed by two resource blocks, for example). According to these aspects, while the UE is configured using SPS with a TB size of x1, if the eNB receives a BSR that indicates data is present in the UE buffer, the eNB activates (i.e., reconfigures the UE) SPS with fixed TB size of z1 (equal to the quantity of data conveyed by three resource blocks, for example) or y1 (equal to the quantity of data conveyed by four resource blocks, for example) based on the amount of data indicated in the BSR. While the UE is configured using SPS with a TB size of y1, if the eNB does not receive a BSR, receives a BSR indicating there is no data present in the UE buffer, or receives padding in an uplink transmission from the UE, the eNB activates (i.e., reconfigures the UE) SPS with TB size x1 or z1.

The eNB may determine whether to use x1 or z1 based on an amount of padding received in an uplink transmission from the UE. While the UE is configured using SPS with a TB size of z1, if the eNB receives a BSR that indicates data is present in the UE buffer, the eNB activates (i.e., reconfigures the UE) SPS with fixed TB size of y1. If the eNB does not receive a BSR, receives a BSR indicating there is no data present in the UE buffer, or receives padding in an uplink transmission from the UE, the eNB activates (i.e., reconfigures the UE) SPS with TB size x1.

According to certain aspects of the present disclosure, the above techniques may be generalized for cases of packet bundling where the number of packets bundled in each transmission is more than 2 (i.e., N>2). According to these aspects, x1 is determined such that a TB of size x1 is large enough to transport N packets of size x, y1 is determined such that a TB of size y1 is large enough to transport N packets of size y, and z1 is determined so that z1 is between x1 and y1.

According to aspects of the present disclosure, scheduling request masking (SR-masking) may be configured for a logical channel so that a UE may perform the above techniques while improving the techniques' power efficiency (i.e., along with C-DRX). SR-masking prevents a UE from waking up from DRX OFF when a BSR is triggered on the UE, and hence aligns the uplink transmissions with a configured C-DRX ON duration.

When a UE is performing packet bundling, however, SR-masking may cause very large scheduling delays when there is a mismatch between the size of the grant of the SPS and the amount of data in the UE buffer. In VBR, this problem could arise when a UE receives a grant for two half-rate packets while having two full rate (or 1 full rate and 1 half rate) packets awaiting transmission in the UE's buffer. By the time the eNB receives the BSR from the UE and the UE wakes up for the next C-DRX ON duration, the maximum allowable delay requirement for scheduling the older packets may be exceeded.

According to aspects of the present disclosure, a UE may be configured to perform SR-masking for a logical channel based on an amount of data in the buffer for the logical channel. That is, SR-masking for a logical channel may be dynamically enabled or disabled by the UE based on an amount of data in the buffer for the logical channel. According to these aspects, while a UE has SR-masking configured and active for a logical channel, if a BSR is triggered and the amount of data for the logical channel is above a threshold (the threshold may be configured by higher layer signaling, such as RRC, or by a MAC control element, for example), then the UE triggers a Scheduling Request. The configured threshold for disabling SR-masking may be in terms of a number of MAC service data units (SDUs) in the logical channel buffer or a total number of bytes of data for the logical channel, for example.

According to aspects of the present disclosure, the techniques described above may be applied to dynamic scheduling or pseudo-SPS scheduling. In these aspects, instead of configuring and activating SPS grants, an eNB may sends grants dynamically, and periodically in case of pseudo-SPS, with TB sizes of the grants determined according to the techniques above.

Figure 7:
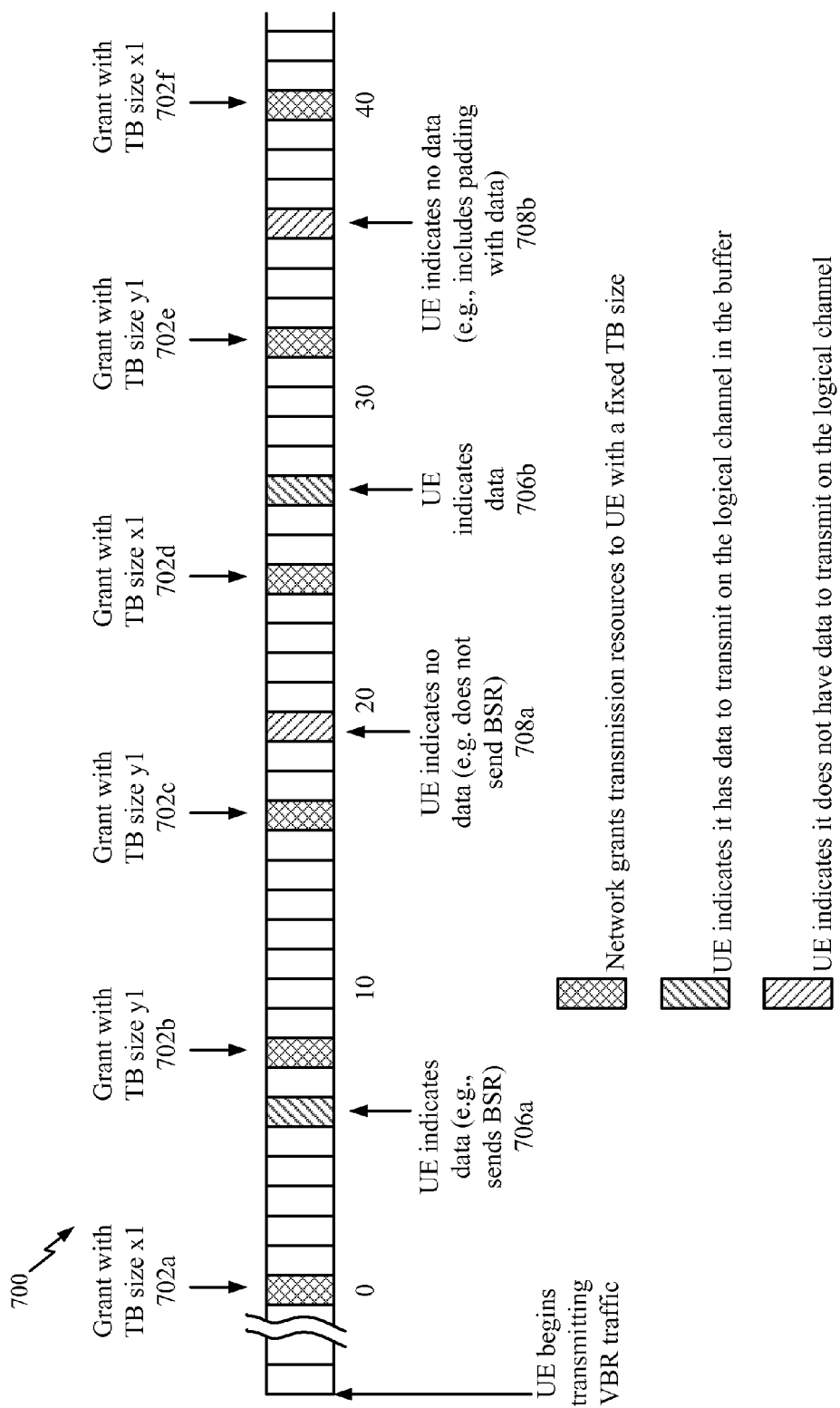
FIG. 7 illustrates an exemplary timeline of a UE transmitting VBR traffic, in accordance with aspects of the present disclosure.

FIG. 7 illustrates an exemplary timeline 700 of a UE transmitting VBR traffic for a logical channel in a network using the techniques described above. A UE transmitting a VBR voice call according to the timeline 700 may cause the call to appear continuous to users. The UE may also reduce overhead signaling of the network and avoiding wasting transmission resources when compared to both dynamic scheduling of the UE and previous techniques of SPS. The network may rapidly change the transmission resources allocated to the UE for the VBR voice call without dynamically signaling all of the allocations to the UE.

At each of times 702, the network (e.g., the UE's serving eNB) grants transmission resources to the UE. For example, at time 702a, the network grants transmission resources for the logical channel with a TB size of x1, and the UE begins the VBR transmissions. At time 706a, the UE indicates to the network that it has data to transmit on the logical channel in the UE's buffer (e.g., by transmitting a BSR), and at time 702b, the network grants transmission resources with a TB size of y1. Thus, the network increases the transmission resources assigned to the UE so that the UE can transmit data faster and empty the UE's buffer. At time 702c, the network grants transmission resources with a TB size y1. At time 708a, the UE indicates to the network that it does not have data to transmit for the logical channel (e.g., by not sending a BSR). At time 702d, the network grants transmission resources for the logical channel with a TB size of x1. As x1 is smaller than y1, the network has reduced the transmission resources allocated to the call, avoiding wasting of some transmission resources. At time 706b, the UE indicates to the network that it has data to transmit on the logical channel in the UE's buffer, and at time 702e, the network grants transmission resources with a TB size of y1, increasing the allocation for the call again. At time 708b, the UE indicates to the network that it does not have data to transmit for the logical channel (e.g., by including padding in a data transmission for the logical channel). At time 702f, the network grants transmission resources for the logical channel with a TB size of x1, again reducing the resources allocated to the call.

Figure 8:
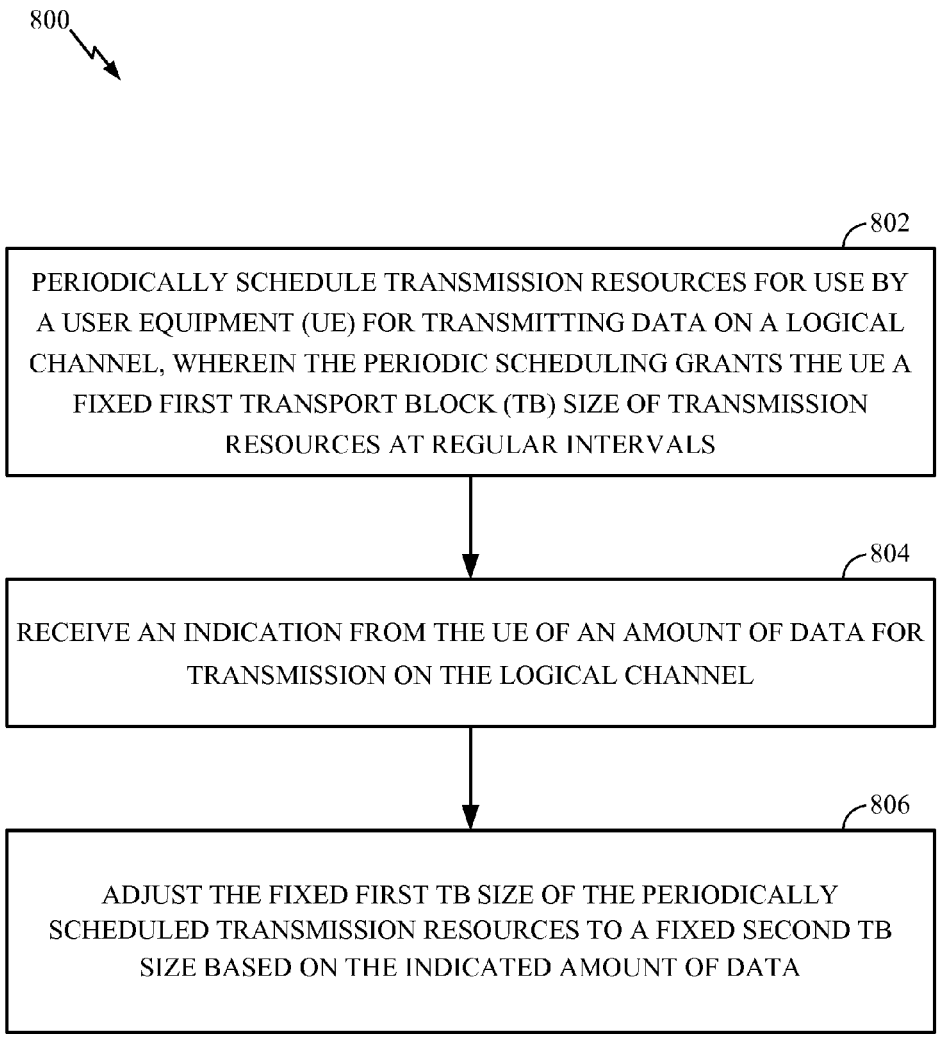
FIG. 8 illustrates exemplary operations that may be performed by a BS, in accordance with aspects of the present disclosure.

FIG. 8 illustrates exemplary operations 800 that may be performed for efficient support of variable bit rate (VBR) voice traffic on LTE uplink. Operations 800 may be performed by a base station (BS) or eNB supporting a UE operating according to the exemplary timeline 700, for example.

Operations 800 begin at 802, by the BS, periodically (i.e., regularly) scheduling transmission resources for use by a user equipment (UE) for transmitting data on a logical channel, wherein the periodic scheduling grants the UE a fixed (i.e., fixed until adjusted) first transport block (TB) size of transmission resources at regular intervals. At 804, the BS receives an indication from the UE of an amount of data for transmission on the logical channel. At 806, the BS adjusts the fixed first TB size of the periodically scheduled transmission resources to a fixed (i.e., fixed until adjusted) second TB size based on the indicated amount of data.

According to certain aspects of the present disclosure, adjusting the fixed first TB size may comprise setting the fixed second TB size to a TB size selected from a plurality of TB sizes based on the indicated amount of data.

Figure 9:
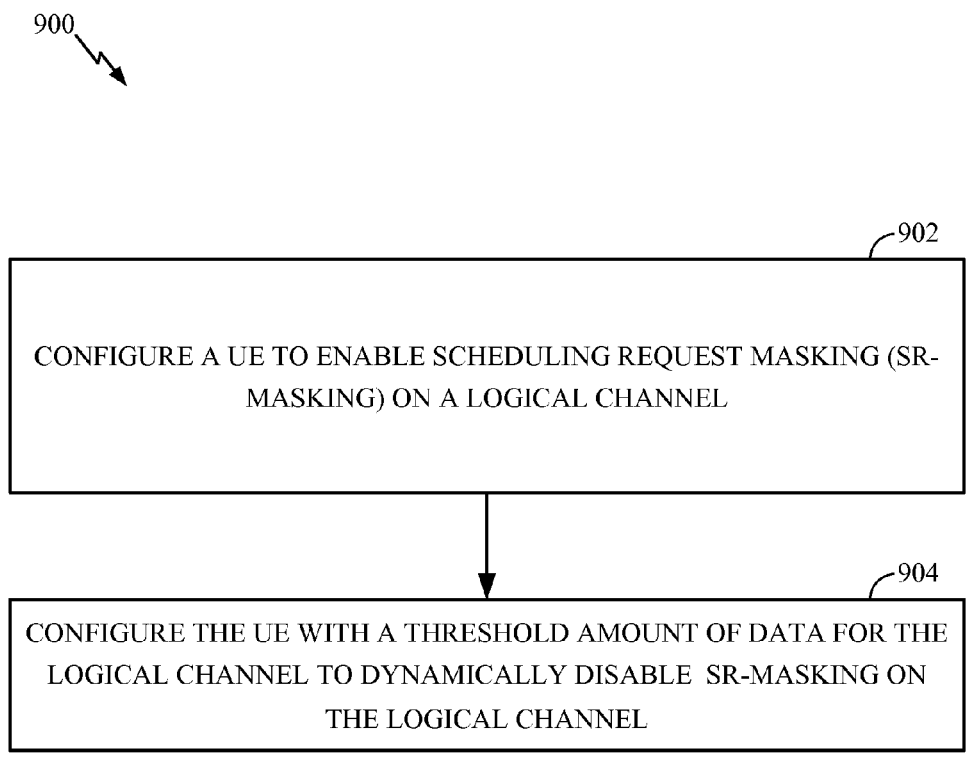
FIG. 9 illustrates exemplary operations that may be performed by a BS, in accordance with aspects of the present disclosure.

FIG. 9 illustrates exemplary operations 900 that may be performed for efficient support of variable bit rate (VBR) voice traffic on LTE uplink. Operations 900 may be performed by a base station (BS) or eNB, for example. Operations 900 begin at 902, by the BS configuring a UE to enable scheduling request masking (SR-masking) on a logical channel. At 904, the BS configures the UE with a threshold amount of data for the logical channel to dynamically disable SR-masking on the logical channel.

According to certain aspects of the present disclosure, the operations 900 may be combined with the operations 800 and performed by a BS. That is, a BS may periodically schedule transmission resources for use by a UE for transmitting data on a logical channel according to FIG. 8, and configure the UE enable SR-masking on the logical channel with a threshold amount of data for the UE to disable the SR-masking for the logical channel, as described above in FIG. 9.

Figure 10:
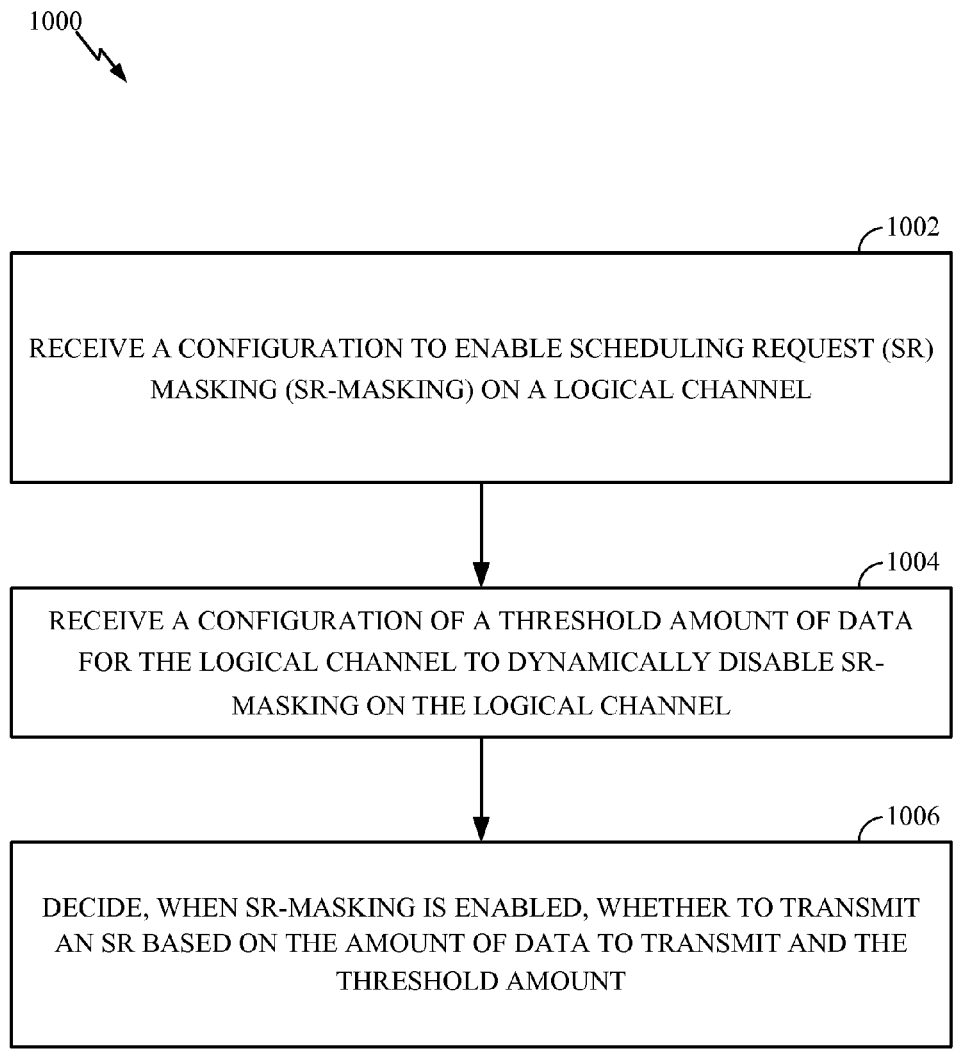
FIG. 10 illustrates exemplary operations that may be performed by a UE, in accordance with aspects of the present disclosure.

FIG. 10 illustrates exemplary operations 1000 that may be performed for efficient support of variable bit rate (VBR) voice traffic on LTE uplink. Operations 1000 may be considered complementary to operation 900, and may be performed by a user equipment (UE), for example. Operations 1000 begin at 1002, by the UE receiving a configuration to enable scheduling request (SR) masking (SR-masking) on a logical channel. At 1004, the UE receives a configuration of a threshold amount of data for the logical channel to dynamically disable SR-masking on the logical channel. At 1006, the UE decides, when SR-masking is enabled, whether to transmit an SR based on the amount of data to transmit and the threshold amount.

Figure 11:
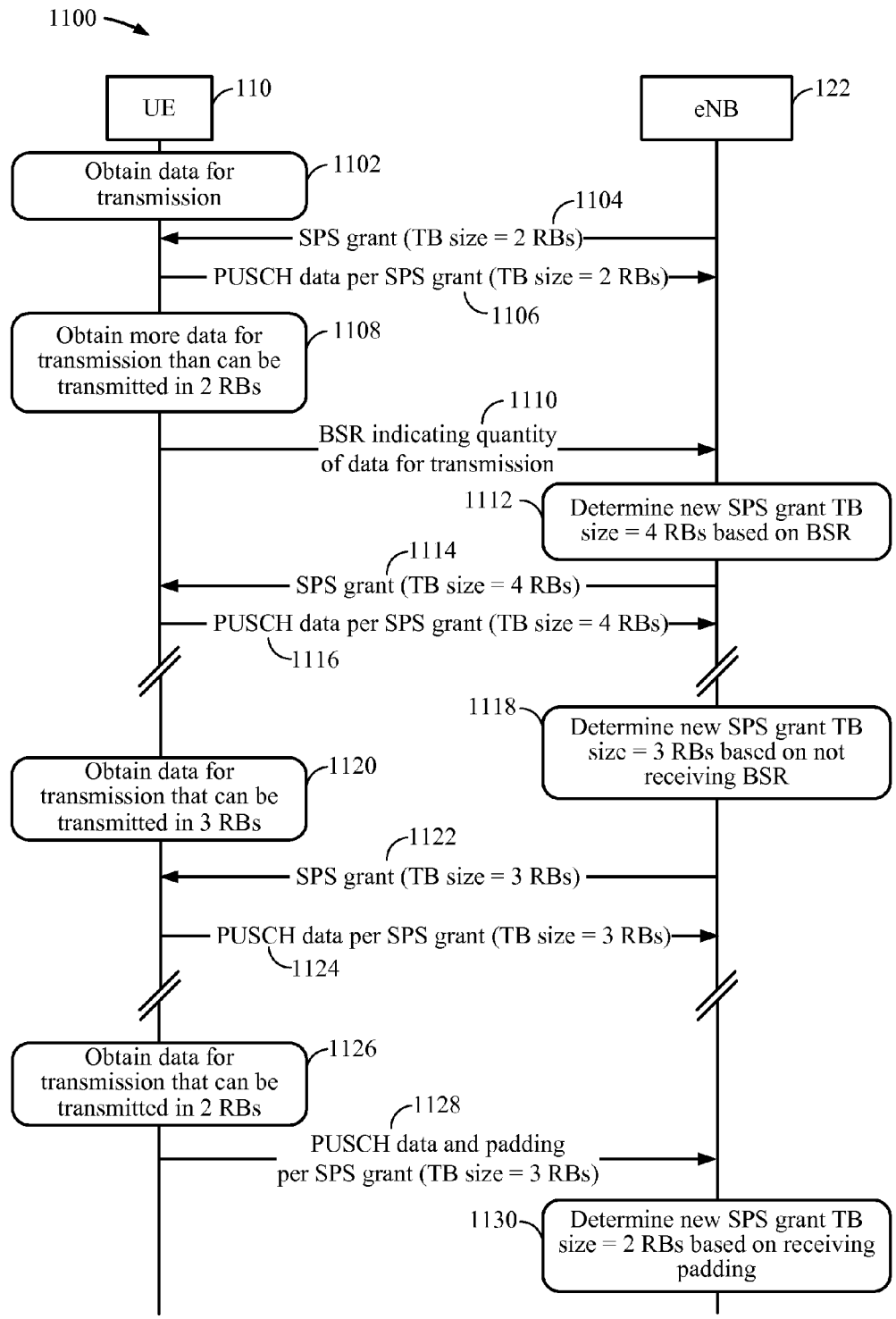
FIG. 11 illustrates an exemplary call flow for operations by a UE and an eNB, according to aspects of the present disclosure.

FIG. 11 illustrates an exemplary call flow 1100 between a UE 110 and an eNB 122 for efficient support of variable bit rate (VBR) voice traffic on LTE uplink, according to aspects of the present disclosure. The illustrated call flow shows signaling between an eNB, operating according to operations 800, and a supported UE that is bundling multiple packets in each transmission (i.e., N≥2, as described above). The supported UE operates similarly to the timeline shown in FIG. 7, in that the UE indicates that it has data or no data and receives scheduling grants at various points in call flow 1100.

The UE is already connected for performing a VBR voice call when the UE obtains data for transmission at 1102. At 1104, the eNB transmits an SPS grant with transport block (TB) size equal to an amount of data conveyed by two resource blocks (RBs). At 1106, the UE transmits a PUSCH according to the SPS grant.

At 1108, the UE obtains more data for transmission. The quantity of data obtained is more than the UE can transmit in two RBs. At 1110, the UE transmits a buffer status report (BSR) indicating the quantity of data to be transmitted. At 1112, the eNB determines a new SPS grant size with TB size equal to an amount of data conveyed by four RBs. At 1114, the eNB transmits an SPS grant with TB size equal to the determined TB size (i.e., TB size equal to a quantity of data conveyed by four RBs). At 1116, the UE transmits a PUSCH according to the SPS grant (from 1114).

When the UE continues to transmit PUSCHs per the SPS grant without sending BSRs, the eNB determines a new SPS grant size with TB size equal to an amount of data conveyed by three RBs at 1118. Three RBs is selected as the TB size of the new grant because the UE is bundling packets in transmissions and three is between two and four. As described above, when the UE is bundling packets (i.e., N≥2), the eNB operates with grants of size x1, y1, and z1, wherein x1<z1<y1. While y1 is selected based on N packets of the maximum size y and x1 is selected based on N packets of the minimum size x, z1 is selected to be between x1 and y1. At 1120, the UE obtains more data for transmission. The quantity of data obtained at 1120 can be transmitted in three RBs. The actions at 1118 and 1120 need not occur in the illustrated order, and the UE may obtain the data for transmission prior to the eNB determining a new SPS grant size. At 1122, the eNB transmits an SPS grant with TB size equal to the determined TB size (i.e., TB size equal to a quantity of data conveyed by three RBs). At 1124, the UE transmits a PUSCH according to the SPS grant (from 1122).

At 1126, the UE obtains more data for transmission. The quantity of data obtained at 1126 can be transmitted in two RBs. At 1128, the UE transmits a PUSCH according to the SPS grant (from 1122). Because the quantity of data obtained at 1126 can be transmitted in two RBs and the SPS grant is for a TB size equal to an amount of data that can be transmitted in three RBs, the UE includes padding with the data. At 1130, the eNB determines a new SPS grant size with TB size equal to an amount of data conveyed by two RBs. The eNB may then transmit an SPS grant with TB size equal to the determined TB size (i.e., TB size equal to a quantity of data conveyed by two RBs), similarly to 1104.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. As used herein, a phrase referring to "at least one of" a list of items refers to any combination of those items, including single members. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communications by a base station (BS), comprising:
   periodically scheduling transmission resources for use by a user equipment (UE) for transmitting data on a logical channel, wherein the periodically scheduling grants the UE a fixed first transport block (TB) size of transmission resources at regular intervals;
   receiving an indication from the UE of an amount of data for transmission on the logical channel;
   adjusting the fixed first TB size of the periodically scheduled transmission resources to a fixed second TB size based on the indicated amount of data;
   configuring the UE to enable scheduling request masking (SR-masking) on the logical channel; and
   configuring the UE with a threshold amount of data, larger than the fixed second TB size, for the logical channel to dynamically disable SR-masking on the logical channel.

2. The method of claim 1, wherein periodically scheduling transmission resources for use by the UE comprises semi-persistent scheduling (SPS).

3. The method of claim 1, wherein the indication is received via a buffer status report (BSR).

4. A method for wireless communications by a base station (BS), comprising:
   periodically scheduling transmission resources for use by a user equipment (UE) for transmitting data on a logical channel, wherein the periodically scheduling grants the UE a fixed first transport block (TB) size of transmission resources at regular intervals;
   receiving an indication, via a buffer status report (BSR), from the UE of an amount of data for transmission on the logical channel;
   adjusting the fixed first TB size of the periodically scheduled transmission resources to a fixed second TB size based on the indicated amount of data, wherein adjusting the fixed first TB size of the periodically scheduled transmission resources to the fixed second TB size based on the indicated amount of data comprises decreasing the fixed first TB size if the BSR indicates the UE has no data to transmit.

5. The method of claim 1, wherein:
the indication comprises padding received in an uplink transmission; and
adjusting the fixed first TB size of the periodically scheduled transmission resources to the fixed second TB size based on the indicated amount of data comprises decreasing the fixed first TB size.

6. The method of claim 1, wherein adjusting the fixed first TB size comprises setting the fixed second TB size to a TB size selected from a plurality of TB sizes based on the indicated amount of data.

7. The method of claim 1, wherein the logical channel is used by the UE for transmitting variable bit rate (VBR) voice traffic.

8. A method for wireless communications by a base station (BS), comprising:
periodically scheduling transmission resources for use by a user equipment (UE) for transmitting data on a logical channel, wherein the periodically scheduling grants the UE a fixed first transport block (TB) size of transmission resources at regular intervals;
receiving an indication from the UE of an amount of data for transmission on the logical channel; and
adjusting the fixed first TB size of the periodically scheduled transmission resources to a fixed second TB size based on the indicated amount of data, wherein adjusting the fixed first TB size comprises setting the fixed second TB size to a TB size based on a number of packets to be bundled per uplink transmission on the logical channel.

9. A method for wireless communications by a base station (BS), comprising:
periodically scheduling transmission resources, during connected discontinuous reception (C-DRX) ON durations, for use by a user equipment (UE) for transmitting data on a logical channel, wherein the periodically scheduling grants the UE a fixed first transport block (TB) size of transmission resources at regular intervals;
receiving an indication from the UE of an amount of data for transmission on the logical channel; and
adjusting the fixed first TB size of the periodically scheduled transmission resources to a fixed second TB size based on the indicated amount of data.

10. The method of claim 1, further comprising configuring the UE with a connected discontinuous reception (C-DRX) configuration, wherein the periodically scheduled transmission resources occur during ON durations of the C-DRX configuration.

11. An apparatus for wireless communications by a base station (BS), comprising:
at least one processor configured to:
periodically schedule transmission resources for use by a user equipment (UE) for transmitting data on a logical channel, wherein the periodically scheduling grants the UE a fixed first transport block (TB) size of transmission resources at regular intervals;
receive an indication from the UE of an amount of data for transmission on the logical channel;
adjust the fixed first TB size of the periodically scheduled transmission resources to a fixed second TB size based on the indicated amount of data;
configure the UE to enable scheduling request masking (SR-masking) on the logical channel; and
configure the UE with a threshold amount of data, larger than the fixed second TB size, for the logical channel to dynamically disable SR-masking on the logical channel; and
a memory coupled with the at least one processor.

12. The apparatus of claim 11, wherein the at least one processor is configured to periodically schedule transmission resources for use by the UE by performing semi-persistent scheduling (SPS).

13. The apparatus of claim 11, wherein the indication is received via a buffer status report (BSR).

14. An apparatus for wireless communications by a base station (BS), comprising:
at least one processor configured to:
periodically schedule transmission resources for use by a user equipment (UE) for transmitting data on a logical channel, wherein the periodically scheduling grants the UE a fixed first transport block (TB) size of transmission resources at regular intervals;
receive an indication, via a buffer status report (BSR), from the UE of an amount of data for transmission on the logical channel; and
adjust the fixed first TB size of the periodically scheduled transmission resources to a fixed second TB size based on the indicated amount of data by decreasing the fixed first TB size if the BSR indicates the UE has no data to transmit; and
a memory coupled with the at least one processor.

15. The apparatus of claim 11, wherein:
the indication comprises padding received in an uplink transmission; and
the at least one processor is configured to adjust the fixed first TB size of the periodically scheduled transmission resources to the fixed second TB size based on the indicated amount of data by decreasing the fixed first TB size.

16. The apparatus of claim 11, wherein the at least one processor is configured to adjust the fixed first TB size by setting the fixed second TB size to a TB size selected from a plurality of TB sizes based on the indicated amount of data.

17. The apparatus of claim 11, wherein the logical channel is used by the UE for transmitting variable bit rate (VBR) voice traffic.

18. An apparatus for wireless communications by a base station (BS), comprising:
at least one processor configured to:
periodically schedule transmission resources for use by a user equipment (UE) for transmitting data on a logical channel, wherein the periodically scheduling grants the UE a fixed first transport block (TB) size of transmission resources at regular intervals;
receive an indication from the UE of an amount of data for transmission on the logical channel; and
adjust the fixed first TB size of the periodically scheduled transmission resources to a fixed second TB size based on the indicated amount of data by setting the fixed second TB size to a TB size based on a number of packets to be bundled per uplink transmission on the logical channel; and
a memory coupled with the at least one processor.

19. An apparatus for wireless communications by a base station (BS), comprising:
at least one processor configured to:
periodically schedule transmission resources for use by a user equipment (UE) for transmitting data on a logical channel, wherein the periodically scheduling grants the UE a fixed first transport block (TB) size of transmission resources at regular intervals;
receive an indication from the UE of an amount of data for transmission on the logical channel;

adjust the fixed first TB size of the periodically scheduled transmission resources to a fixed second TB size based on the indicated amount of data; and periodically schedule transmission resources for use by the UE during connected discontinuous reception (C-DRX) ON durations; and a memory coupled with the at least one processor.

20. The apparatus of claim 11, wherein the at least one processor is further configured to configure the UE with a connected discontinuous reception (C-DRX) configuration, wherein the periodically scheduled transmission resources occur during ON durations of the C-DRX configuration.

21. An apparatus for wireless communications by a base station, comprising:

means for periodically scheduling transmission resources for use by a user equipment (UE) for transmitting data on a logical channel, wherein the periodically scheduling grants the UE a fixed first transport block (TB) size of transmission resources at regular intervals;

means for receiving an indication from the UE of an amount of data for transmission on the logical channel;

means for adjusting the fixed first TB size of the periodically scheduled transmission resources to a fixed second TB size based on the indicated amount of data;

means for configuring the UE to enable scheduling request masking (SR-masking) on the logical channel; and means for configuring the UE with a threshold amount of data, larger than the fixed second TB size, for the logical channel to dynamically disable SR-masking on the logical channel.

22. A computer-readable medium storing computer executable code, comprising instructions for:

periodically scheduling transmission resources for use by a user equipment (UE) for transmitting data on a logical channel, wherein the periodically scheduling grants the UE a fixed first transport block (TB) size of transmission resources at regular intervals;

receiving an indication from the UE of an amount of data for transmission on the logical channel;

adjusting the fixed first TB size of the periodically scheduled transmission resources to a fixed second TB size based on the indicated amount of data;

configuring the UE to enable scheduling request masking (SR-masking) on the logical channel; and configuring the UE with a threshold amount of data, larger than the fixed second TB size, for the logical channel to dynamically disable SR-masking on the logical channel.

* * * * *